United States Patent [19]

Morisawa

[11] Patent Number: 4,652,943
[45] Date of Patent: Mar. 24, 1987

[54] HEAD LOADING DEVICE FOR ELECTRONIC STILL SINGLE-LENS REFLEX CAMERA

[75] Inventor: Tahei Morisawa, Tokyo, Japan

[73] Assignee: Asahi Kogaku Kogyo Kabushiki Kaisha, Tokyo, Japan

[21] Appl. No.: 669,980

[22] Filed: Nov. 9, 1984

[30] Foreign Application Priority Data

Dec. 24, 1983 [JP] Japan ................. 58-251409

[51] Int. Cl.⁴ ........................................... H04N 5/781
[52] U.S. Cl. ........................... 360/35.1; 360/130.34; 358/906; 358/909
[58] Field of Search ............... 358/906, 335, 909; 360/35.1, 130.34, 130.3, 33.1

[56] References Cited

U.S. PATENT DOCUMENTS 4,085,428 4/1978 Green .............................. 360/130.34

FOREIGN PATENT DOCUMENTS 48407 7/1984 Japan .................................. 360/35.1

Primary Examiner—Alan Faber
Attorney, Agent, or Firm—Sughrue, Mion, Zinn, Macpeak and Seas

[57] ABSTRACT

An electronic still single-lens reflex camera having a head loading device having a simplified construction and low power consumption. A depressing pad which is displaceable towards the magnetic recording medium is provided on the side of the medium opposite the side adjacent the magnetic recording head. An interlocking mechanism displaces the depressing pad towards the recording medium in association with the operation of a drive unit adapted to drive the image mirror of the camera and positioned so that the recording medium is pushed against the magnetic recording head by the depressing pad.

3 Claims, 6 Drawing Figures

HEAD LOADING DEVICE FOR ELECTRONIC STILL SINGLE-LENS REFLEX CAMERA

BACKGROUND OF THE INVENTION

The present invention relates to an electronic still single-lens reflex camera having an image sensor which subjects the image of an object to photoelectric conversion to obtain an electrical signal and the electrical signal thus obtained is recorded on a magnetic recording medium by a magnetic recording head. More particularly, the invention relates to a head loading device which pushes the recording medium against the recording head in an image signal recording operation.

In an electronic camera, an image sensor such as a solid-state image pickup element is used to obtain an electrical signal indicative of the brightness of the image of an object, and the electrical signal thus obtained is stored on a magnetic disc. Because the electronic camera employs an image sensor instead of film, the essential components of the camera other than the image sensor may be the same as those of a conventional film camera such as a still single-lens reflex camera. That is, the photometric device, the viewfinder optical system, the quick return mirror, the shutter and the lens stop of the still single-reflex camera can be used without modification to control exposure.

On the other hand, in the electronic still single-lens reflex camera, electrical signals provided by the image sensor are processed to be recorded on a recording medium, namely, a magnetic disk. In order to record the signals on the recording medium, a magnetic recording head is used. In the recording operation, the magnetic recording head should be in a loading state where it is in contact with the magnetic disk under a suitable contact pressure. However, when no recording operation is being carried out, such as when the recording head is moving radially of the magnetic disk, the recording head performs tracking, or when the magnetic disk is turned after the tracking operation, the recording head should be in an unloading state where it is held slightly away from the magnetic disk. In order to place the head in the loading state in the recording operation, the conventional electronic still single-lens camera uses a depressing pad or the like coupled to an electromagnetic device such as a direct advance solenoid to urge the magnetic disk against the magnetic recording head. However, the conventional head loading device, requiring an electromagnetic component such as the direct advance solenoid as its drive source, suffers from difficulties that it is intricate in construction and large in power consumption.

SUMMARY OF THE INVENTION

In view of the above-described difficulties accompanying a conventional electronic still single-lens reflex camera, the invention has been developed whereby a head loading force is obtained from a drive unit provided for an image mirror which is normally positioned in the image beam path to direct an image beam to the viewfinder optical system and which, when a photographing operation is carried out, is retracted from the path to apply the image beam to the image sensor.

A specific feature of an electronic still single-lens reflex camera according to the invention resides in that a depressing pad displaceable towards the magnetic recording medium is provided on a side of the magnet recording medium opposite to the side where the magnetic recording head is provided, and an interlocking mechanism for displacing the depressing pad towards the magnetic recording medium in association with the operation of the drive unit of the image mirror is provided so that the magnetic recording medium is pushed against the magnetic recording head by the depressing pad.

DESCRIPTION OF THE PREFERRED EMBODIMENTS

The invention will be described with reference to preferred embodiments.

Figure 1:
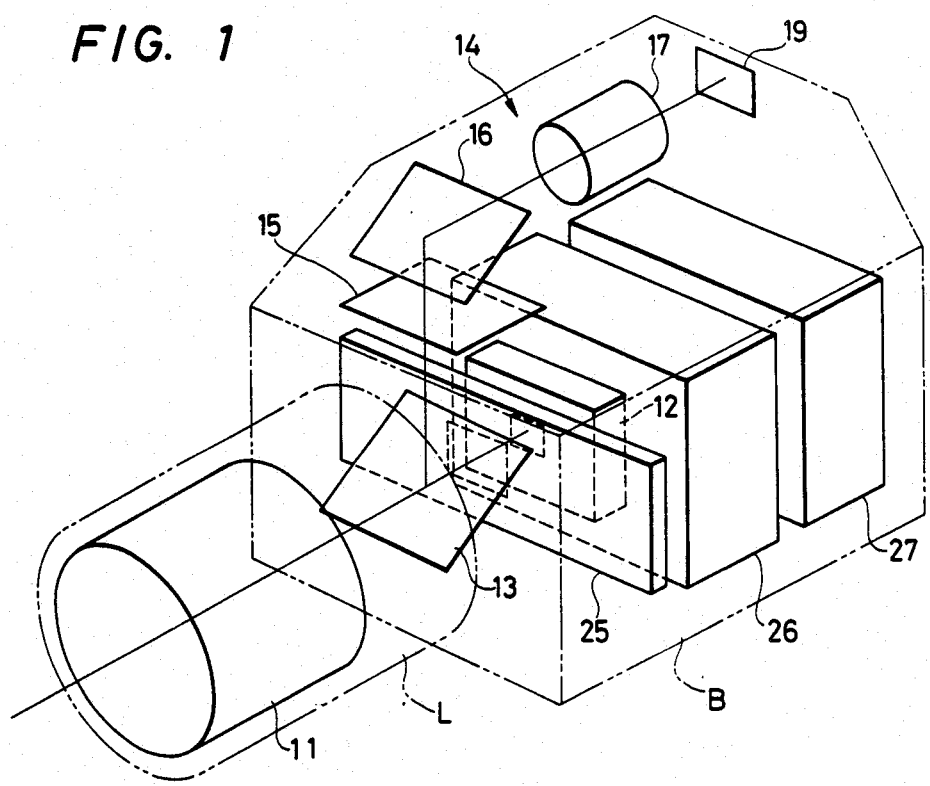
FIG. 1 is a perspective view outlining an example of the construction of an electronic still single-lens reflex camera.
Figure 2:
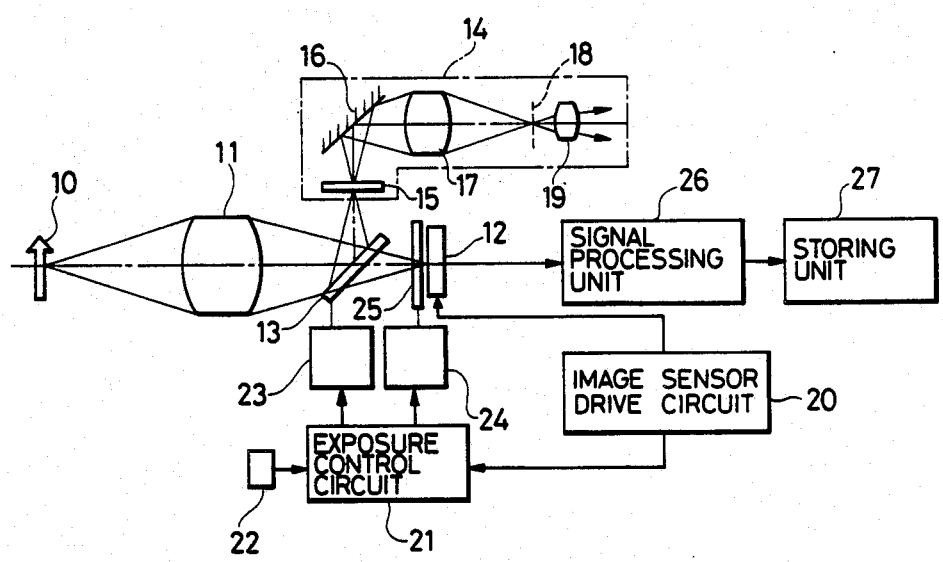
FIG. 2 is a systematic connection diagram of the camera including its optical system.

FIGS. 1 and 2 show the fundamental arrangement of an electronic camera of the type to which the invention pertains. The electronic camera includes a lens barrel L having a photographing lens 11 and a body B. The body B incorporates elements for processing the image of an object 10 formed by the photographing lens 11. That is, an image sensor 12 is disposed on the optical axis (image beam), and a shutter 25 and an image mirror 13 are arranged in front of the image sensor 12. The image mirror 13 normally forms an angle of 45° with respect to the optical axis to apply the image beam to a viewfinder optical system including a focusing screen 15, a mirror 16, a relay lens 17 and an eyepiece lens 19. However, during a photographing operation, the image mirror is retracted from the image beam so that the image beam is applied to the image sensor 12. The viewfinder optical system 14 may be of a conventional type using a pentaprism. Accordingly, with the optical system of the electronic camera, normally the image of an object is formed on an image-forming plane 18 in the viewfinder optical system 14, and the image thus formed can be observed through the eyepiece lens 19, while in a photographing operation, the image mirror 13 is swung upwardly to direct the image beam to the image sensor 12.

When a release switch is depressed in a photographing operation, an image sensor drive circuit 20 effects scanning of the image sensor 12 for a period of one field or frame to eliminate charges accumulated in the image sensor 12. An exposure control circuit 21 outputs an exposure control signal according to the output of a photometric element 22 which subjects the brightness of the image of an object to photoelectric conversion. A mirror drive unit 23 retracts the image mirror 13 from the image beam after the aforementioned scanning has been accomplished. Next, the shutter 25 is opened by a shutter drive unit 24 which receives the output of the exposure control circuit 21, and the shutter 25 is closed after correct exposure has been accomplished. Upon completion of the exposure, the image mirror 13 is returned to the initial position where it was before being retracted, and at the same time the image sensor drive circuit 20 scans one field or frame so that the charges which are accumulated in the image sensor 12 while the shutter 25 is maintained open are read and applied to a signal processing circuit 26. In the signal processing circuit, the image signal is suitably processed and applied to a storing unit 27 with a magnetic recording head 30 (see FIGS. 4 and 6) where it is stored on a magnetic disk 31 (see FIGS. 4 and 6). When the shutter 25 is closed, motors in the shutter drive unit 24 and the mirror drive unit 23 are driven to restore the drive forces of the shutter 25 and the image mirror 13. Thus, the camera has become ready for the next photographing operation.

Figure 3:
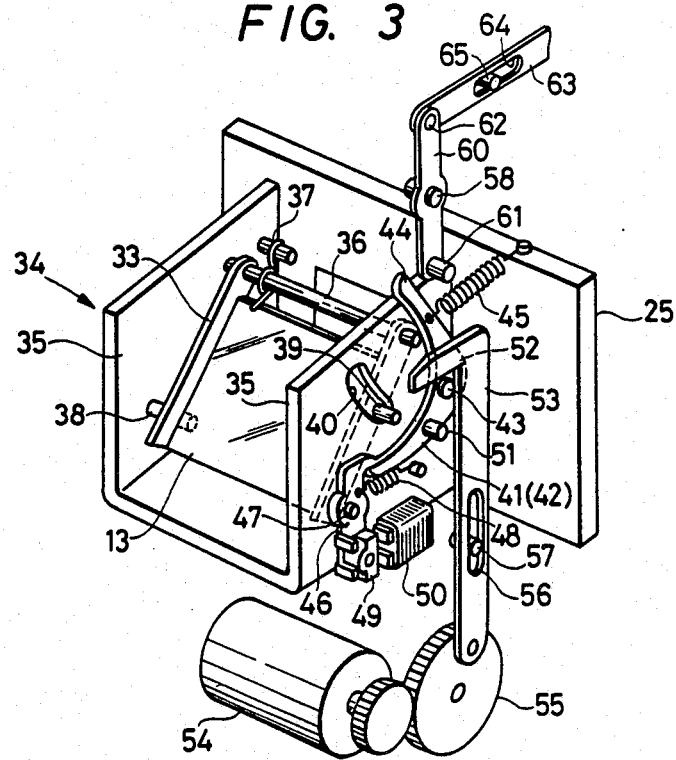
FIG. 3 is a perspective view showing essential components of an example of an electronic still single-lens reflex camera according to this invention.
Figure 4:
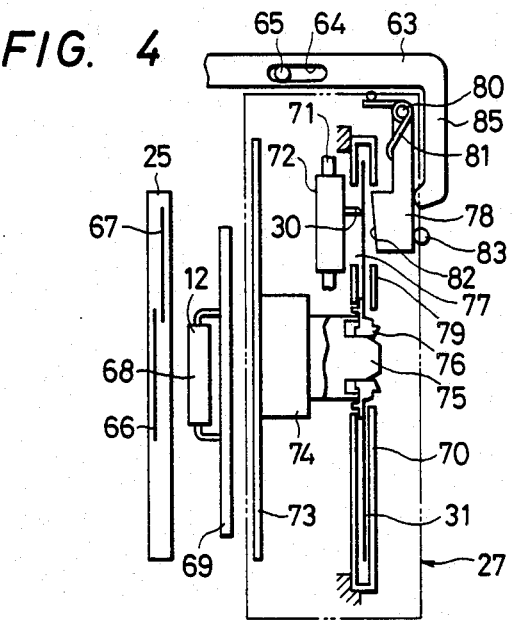
FIG. 4 is a side view of the same.

FIGS. 3 and 4 show a preferred embodiment of a head loading device of this invention in which the mirror drive unit 23, the shutter 25, the storing unit 27, and an interlocking mechanism for the mirror drive unit 23 and the storing unit 27 are shown. The mirror 13 is bonded to a mirror sheet 33. The upper edge of the mirror sheet 33 is fixedly secured to a mirror sheet shaft 36 which is pivotally held between inner walls 35 of a mirror box 34. The image mirror 13 together with the mirror sheet shaft 36 can swing between the position where it forms an angle of 45° with the image beam and the position to which it is retracted from the image beam. Reference numeral 37 designates a return spring which urges the image mirror 13 downwardly to position it in the image beam path. Reference numeral 38 designates a positioning pin which holds against the elastic force of the spring 37 the image mirror 13 at the position where the latter forms an angle of 45° with the image beam.

An operation pin 39 is fixed to one side of the mirror sheet 33. The operating pin 39 is engaged with an arcuate groove 40 formed in the inner wall 35 extending outside the inner wall. An operating lever 42 having an operating arm 41 is pivotally mounted on a shaft 43 fixed to the outside of the inner wall 35. The operating arm 41 is engageable with the operating pin 39 from below. A tension spring 45 is connected to the interlocking arm 44 of the operating lever 42 to urge the operating arm 41 upwardly. A locking lever 46 is pivotally mounted on a shaft 47 fixed to the outside of the inner wall 35. The locking lever 46 is engaged with the operating arm 41 so that the operating arm 41 is held at the position where it is not engaged with the operating pin for times other than exposure times. Refereence numeral 48 designates a tension spring used to turn the locking lever 46 so as to cause the latter to engage with the operating arm 41. The locking lever 46 has an armature 49, and an exciting magnet 50 is fixedly mounted on the inner wall 35 in such a manner that there is a predetermined gap between the magnet 50 and the armature 49. When the magnet 50 is excited, the armature 49 is attracted by the magnet 50 so that the locking lever 46 is disengaged from the operating arm 41.

A charge pin 51 is fixed to the operating lever 42. A charge lever 53 having a hook 52 engageable with the charge pin 51 is provided besides the inner wall 35. The lower end portion of the charge lever 53 is pivotally mounted on a pin which is provided on a drive gear 55 at an eccentric position and which is driven through a reduction gear by an electric motor 54. An elongated hole 56 formed in the charge lever is engaged with a stationary guide pin 57 so that the charge lever 53 is movable substantially vertically. When the hook 52 is held at a rest position as shown in FIG. 3, it will not engage with the operating pin 39 of the image mirror 13 which is swung upwardly at the time of exposure. When the drive gear 55 makes one revolution after exposure, the hook 52 engages the charge pin 51 of the operating lever 42 which has been turned upwardly. As a result, the operating lever 42 is turned and the operating arm 41 is therefore engaged with the locking lever 46 as shown in FIG. 3.

An interlocking lever 60 pivotally mounted on a stationary shaft 58 is provided above the operating lever 42. An interlocking protrusion 61 is fixed to the lower end portion of the interlocking lever 60. A load bar is pivotally coupled to the upper end portion of the interlocking lever 60 through a pin 62. A stationary guide pin 65 is engaged with an elongated guide hole 64 formed in the load bar 63 which together determine the sliding direction and distance of the interlocking lever 60. At the time of exposure, the operating lever 42 is quickly moved upwardly so that the interlocking arm 44 strikes the interlocking protrusion to slide the load lever 63 horizontally. The load lever 63 is interlocked with the shutter 25 and the storing unit 27 located behind the image sensor 12. The shutter 25 is a focal plane shutter having a top curtain 66 and bottom curtain 67. The image sensor 12 is composed of a solid-state image pickup element 68, set at a position equivalent to the position of a focusing plane, and a base plate 69 to which the element 68 is fixedly secured.

The storing unit 27, as shown in FIG. 4, includes the aforementioned magnetic disk 31 held by a jacket and the above-described magnetic recording head 30 for recording image signals on the magnetic disk 31. The magnetic recording head 30 is secured to a table 72 which is movably supported by a guide rail 71 extending radially of the magnetic disk 31. The magnetic disk 31 is rotated by means of a disk drive motor 74 installed on a base plate 73 and the spindle 75 and the center core 76 thereof. The center core 76 is not in contact with the jacket 70, and therefore the jacket 70 is not rotated. A hole 77 is formed in one side of the jacket 70 in correspondence to the position and the radial movement distance (tracking region) of the magnetic recording head 30, and a hole 79 for a depressing pad 78 is formed on the other side of the jacket 70. The depressing pad 78 is pivotally mounted on a stationary shaft 80 and is urged by a restoring spring 81 so that its depressing surface 82 is moved away from the magnetic disk 31. The depressing surface 82 is so shaped that, when it is turned about the stationary shaft 80, its whole surface is brought into contact with the rear side of the disk 31. Reference numeral 83 designates a positioning pin used to determine the restoring position of the depressing pad 78.

A specific feature of the invention resides in the fact that the depressing pad 78 is turned against the elastic force of the restoring spring 81 by the force of movement of the load bar 63 at the time of exposure to depress the depressing surface 82 of the depressing pad 78 towards the magnetic recording head 3 to obtain a depression force for recording signals. For this purpose, the rear end portion of the load bar 63 is formed into an L-shaped depressing arm 85 which is positioned on the rear surface of the depressing pad which is opposite to the depressing surface 82.

Figure 5:
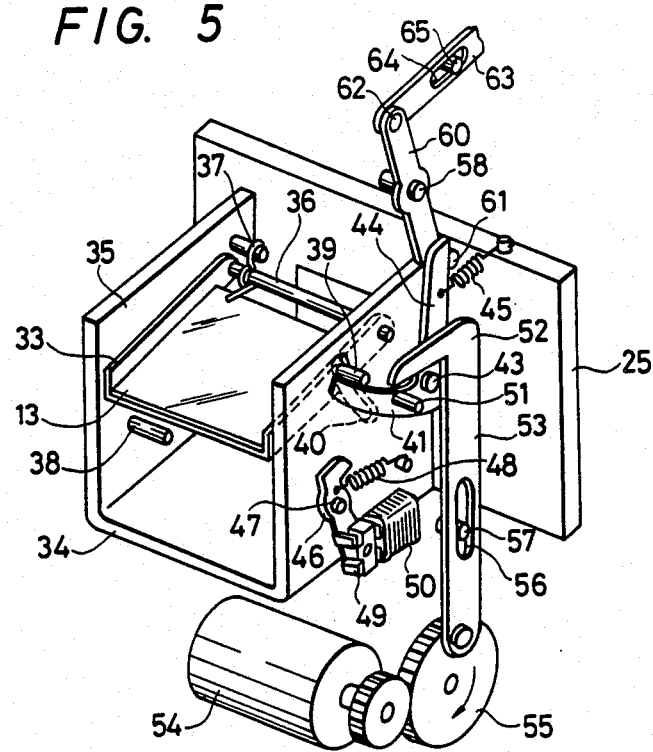
FIG. 5 is a perspective view showing an operating condition different from that shown in FIG. 3.

The device thus constructed according to the invention operates as follows: When, under the condition shown in FIGS. 3 and 4, the shutter button (not shown)

is depressed, the mirror drive unit 23 is operated to energize the magnet 50. As a result, the armature 49 is attracted by the magnet 50 so that the locking lever 46 is disengaged from the operating arm 41 of the operating lever 42. At the same time, the operating arm 41 is turned by the elastic force of the tension spring 45 to push the operating pin 39 upwardly, thereby to raise the image mirror 13 to a substantially horizontal position from the position where the mirror 13 forms an angle of 45° with the optical axis. That is, the image mirror 13 is retracted from the image beam as shown in FIG. 5.

Figure 6:
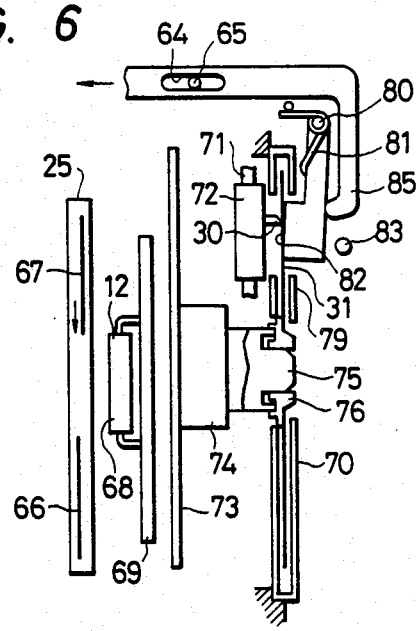
FIG. 6 is a side view showing an operating condition different from that shown in FIG. 4.

When the operating arm 41 turns as described above, the interlocking arm 44 strikes the interlocking protrusion 61 of the interlocking lever 60. As a result, the load bar 63 is pulled forwards through the pin 62 so that the depressing arm 85 pushes the rear surface of the depressing pad 78 forwardly, bringing the magnetic disk 31 into contact with the magnetic recording head 30 under a suitable contact pressure (recording pressure) as shown in FIG. 6.

When the magnet 50 is excited to lift the image mirror as described above, the shutter drive unit 24 operates the shutter 25 so that the top curtain 66 runs to expose the solid-state image pickup element 68 of the image sensor 12. In a predetermined period of time, the bottom curtain 67 runs to end the exposure. At the same time, the charge pattern accumulated in the solid-state image pickup element 68 is converted into an electrical signal by the image sensor drive circuit 20 and the signal processing circuit 26 to a form suitable for recording on the magnetic disk 31. The electrical signal is applied to the magnetic recording head 30. In recording image signals on the magnetic disk 31 by the magnetic recording head 30, the magnetic disk 31 is rotated by the disk drive motor 74 which is controlled by a conventional control device so that the image signals are recorded at predetermined positions on the magnetic disk 31. During this recording operation, no drive signal is applied to the motor 54; that is, the image mirror 13 is maintained raised while the load bar 13 is held at the forward position, and therefore the magnetic disk 31 is maintained in contact with the magnetic recording head 30 under a suitable contact pressure.

When the image signals have been recorded, the motor 54 is driven in response to the recording completion signal to cause the drive gear 55 to make one revolution. As a result, the charge lever 53 is moved downwardly and then upwardly. During the downward movement of the charge lever, the hook 52 is engaged with the charge pin 51 so that the operating arm 41 of the operating lever 42 is engaged with the locking lever 46. Accordingly, the return spring 37 operates to return the image mirror 13 to the position where the mirror 13 forms an angle of 45° with the optical axis as shown in FIG. 3. As the operating lever 42 is restored, the interlocking arm 44 is disengaged from the interlocking protrusions 61, and the interlocking bar 60, the load bar 63 and the depressing pad 78 are restored by the restoring spring 81 as shown in FIG. 4. On the other hand, the shutter 25 is charged by the shutter drive unit 24. The image mirror 13 can be restored to the image beam path nearly instantaneously after the completion of exposure. Therefore, in practice, the image mirror 13 can be realized as a quick-return mirror.

In the above-described embodiment, the depressing pad 78 is moved in association with the retraction of the image mirror 13 from the image beam. However, since it is not always necessary to perform the image signal recording operation with the image mirror raised, the embodiment may be so modified that the depressing pad 78 is moved towards the magnetic disk 31 in association with the restoration of the image mirror to the position where the image mirror forms an angle of 45° with the optical axis to bring the magnetic disk 31 into contact with the recording head 30 under a suitable recording pressure. That is, any suitable arrangement may be employed if it can mechanically displace the depressing pad 78 towards the magnetic disk in association with the operation of the image mirror drive unit. The concept of moving the depressing pad in association with the operation of the image mirror drive unit applies also to the case where the depressing pad is moved by utilization of the force of movement of the image mirror.

The magnetic recording head 30 moves (tracks) radially of the magnetic disk 31 as the photographing operation is repeated. However, the invention is not related to the magnetic recording head moving arrangement.

As is apparent from the above description, the electronic still single-lens reflex camera's head loading device of the invention is so designed that, when image signals are recorded on a magnetic recording medium by the magnetic recording head, the interlocking mechanism operating in association with the image mirror drive unit brings the recording medium into contact with the recording head under a suitable pressure. Therefore, with the head loading device of the invention, unlike the conventional device, the head loading operation can be achieved without a special drive source such as a direct advance solenoid. Accordingly, the electronic camera itself can be made small in size and simplified in construction. Furthermore, the power consumption can be reduced.

I claim:

1. An electronic still single-lens reflex camera having a head loading device, comprising:

an image sensor for subjecting the image of an object formed by a photographing lens to photoelectric conversion;

an image mirror which is normally positioned in an image beam path for directing an image beam to a viewfinder optical system and which, when a photographing operation is carried out, is retracted to a position away from said image beam path in order to permit said image beam to be applied to said image sensor;

a drive unit for driving said image mirror between a normal and a retracted position;

a magnetic recording medium on which image signals provided by said image sensor are recorded; and a magnetic recording head for recording said image signals on said magnetic recording medium, said magnetic recording medium being pushed against said magnetic recording head when said image signals are recorded, wherein the improvement comprises:

a depressing pad displaceable towards said magnetic recording medium provided on one side of said magnetic recording medium opposite to a side thereof adjacent said magnetic recording head; and an interlocking mechanism for displacing said depressing pad towards said magnetic recording medium in association with the operation of said drive unit and into a position so that said magnetic recording medium is pushed against said magnetic recording head by said depressing pad when said image mirror is in said retracted position.

2. The electronic camera of claim 1, wherein said mirror is rotatably mounted to a shaft along the axis of said shaft and is adapted to move between said normal and retracted positions, said mirror having a pin on one side thereof, and said drive unit comprises:

a stationarily mounted electromagnet, a pivotally mounted and spring loaded locking lever having a pawl and being operational between a first and a second position, an armature fixed to said locking lever and adapted to be attracted by said electromagnet to cause pivoting of said locking lever from said first to said second position, a pivotally mounted and spring loaded operating lever adapted to be positioned between a first and a second position and in said first position, having one end engageable by said pawl when said locking lever is in its first position and having said one end free of said pawl, thereby allowing said operating lever to move to said second position, when said locking lever is in its second position, means for moving said operating level from said second position to said first position and said pin fixed to said image mirror being adapted to contact said operating arm during movement from its second position to its first position and thereby cause movement of said mirror from said normal to said retracted position.

3. The electronic camera of claim 2, wherein said interlocking mechanism comprises a pivotally mounted interlocking arm having at one end a protrusion, said arm being rotatable between a first and a second position, and in said first position, being engageable by an upper end of said operating arm when said arm is in its first position, a slidably mounted load bar having a first end pivotally joined to an upper end of said interlocking arm, and a depressing arm integral with said interlocking arm and extending at substantially a right angle to said interlocking arm, said depressing pad being mounted on said interlocking arm and being adapted to be moved between a first position and a second position, said pad being in a first position when said operating arm is in its first position.

* * * * *